United States Patent
Xiao et al.

(10) Patent No.: US 12,223,848 B2
(45) Date of Patent: Feb. 11, 2025

(54) METHOD FOR DETERMINING TRANSITION HEIGHT ELEMENTS IN FLIGHT CLIMBING STAGE BASED ON CONSTANT VALUE SEGMENT IDENTIFICATION

(71) Applicant: THE 28TH RESEARCH INSTITUTE OF CHINA ELECTRONICS TECHNOLOGY GROUP CORPORATION, Nanjing (CN)

(72) Inventors: Yingchao Xiao, Nanjing (CN); Weiyu Jiang, Nanjing (CN); Yungang Tian, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 398 days.

(21) Appl. No.: 17/814,119

(22) Filed: Jul. 21, 2022

(65) Prior Publication Data

US 2022/0358846 A1   Nov. 10, 2022

Related U.S. Application Data

(63) Continuation of application No. PCT/CN2022/101833, filed on Jun. 28, 2022.

(30) Foreign Application Priority Data

Nov. 18, 2021   (CN) .......................... 202111367778.2

(51) Int. Cl.
*G08G 5/00* (2006.01)
*G05D 1/00* (2006.01)

(52) U.S. Cl.
CPC ........... *G08G 5/0065* (2013.01); *G05D 1/042* (2013.01); *G08G 5/0039* (2013.01)

(58) Field of Classification Search
CPC .... G08G 5/006; G08G 5/0039; G08G 5/0021; G05D 1/042; G05D 1/0607
(Continued)

(56) References Cited

U.S. PATENT DOCUMENTS 4,792,906 A * 12/1988 King .................... G05D 1/0653
701/5
5,695,156 A * 12/1997 Firuz .................... G05D 1/0607
244/175

(Continued)

FOREIGN PATENT DOCUMENTS

CN      117406767 A  *  1/2024
WO   WO-2023002054 A1  *  1/2023  ........... G08G 5/0021

*Primary Examiner* — Tuan C To
*Assistant Examiner* — Dominick Mulder
(74) *Attorney, Agent, or Firm* — CBM PATENT CONSULTING, LLC

(57) ABSTRACT

A method for determining transition height elements in a flight climbing stage based on constant value segment identification comprises the steps of splitting a speed component and a Mach component from a flight track, and performing linear interpolation on the two respectively; discretizing the interpolated speed component, and setting a threshold for filtering to obtain a speed discrete value set; identifying a constant-speed segment, and acquiring a maximum constant-speed value and a maximum moment of the constant-speed segment; keeping the Mach component of the track with a time no less than the constant-speed maximum moment; discretizing the kept Mach components, and filtering to obtain a Mach discrete value set; identifying a constant-Mach segment, and acquiring a constant-Mach value corresponding to a minimum moment of the constant-Mach segment; and calculating a transition height in the (Continued)

flight climbing stage according to the constant-speed value and the constant-Mach value obtained.

10 Claims, 3 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 7,650,232 B1* | 1/2010 | Paielli | ................... | G01C 23/005 340/978 |
| 9,536,435 B1* | 1/2017 | Shay | ................... | G08G 5/0043 |
| 11,195,420 B2* | 12/2021 | Blanchon | ............. | G08G 5/0026 |
| 2009/0112535 A1* | 4/2009 | Phillips | .................. | G06Q 10/04 703/2 |
| 2010/0152930 A1* | 6/2010 | Coulmeau | ............ | G05D 1/0202 701/7 |
| 2014/0088799 A1* | 3/2014 | Tino | ......................... | G06F 30/20 703/2 |
| 2014/0365041 A1* | 12/2014 | Deker | .................. | G08G 5/0039 701/4 |
| 2017/0074173 A1* | 3/2017 | Hanrahan | ................. | F02C 9/22 |
| 2017/0132940 A1* | 5/2017 | Lopez Leones | ........ | G06F 30/20 |
| 2017/0227955 A1* | 8/2017 | Krupansky | ............ | G08G 5/0021 |
| 2018/0328188 A1* | 11/2018 | Marinelli | ................. | F01D 5/186 |
| 2019/0197906 A1* | 6/2019 | Bourret | ................... | G08G 5/025 |
| 2020/0348694 A1* | 11/2020 | Ceparu | ................... | B64C 13/18 |
| 2022/0326043 A1* | 10/2022 | Suddreth | .............. | G08G 5/0021 |

* cited by examiner

METHOD FOR DETERMINING TRANSITION HEIGHT ELEMENTS IN FLIGHT CLIMBING STAGE BASED ON CONSTANT VALUE SEGMENT IDENTIFICATION

CROSS REFERENCES

This application is the U.S. continuation application of International Application No. PCT/CN2022/101833 filed on 28 Jun. 2022 which designated the U.S. and claims priority to Chinese Application Nos. number CN202111367778.2 filed 18 Nov. 2021, the entire contents of each of which are hereby incorporated by reference.

TECHNICAL FIELD

The present invention belongs to the field of air traffic management, and more particularly, relates to a method for determining transition height elements in a flight climbing stage based on constant value segment identification.

BACKGROUND

In recent years, economic development has promoted a rapid increase in travel demand, leading to more complex traffic flows and increasingly severe congestion. in order to solve this problem and improve the efficiency of air traffic, more and more attention has been paid to four-dimensional trajectory prediction of aircrafts. Improving track prediction accuracy is helpful to better predict an airspace flow, reasonably distribute controller loads, and then increase the number of flights on the premise of ensuring the safety.

One of the solutions to track prediction problems is a method based on an aircraft dynamics model. In this method, the aircraft is regarded as a mass point, and differential equations are constructed according to a thrust and a drag of the aircraft, as well as speed, height, temperature and other information of a position where the aircraft is located, so as to predict future speed and height of the aircraft. In this model, the whole flight process of the aircraft is roughly divided into a climbing stage, a cruising stage and a descending stage. As physical performances of the aircraft in different stages are different, the corresponding equations of each stage are also different. The climbing stage is further divided into constant-calibrated airspeed climbing and constant-Mach climbing. The applicable formulas of the two are different, so it is necessary to determine the transition point of the two stages, that is, the transition height. Below the transition height, the equation of the constant calibrated airspeed climbing is applicable. Over the transition height, the equation of the constant-Mach climbing is applicable. It can be seen that the determination of the transition height has an important influence on the application of the model. The commonly used method to determine the transition height is to acquire recommended values of transition height elements (constant-speed value and constant-Mach value) of the aircraft model according to the aircraft type, and then calculate to obtain the transition height of the flight of the aircraft type according to these recommended values. However, this method does not take into account the actual flight situation of the aircraft, and the recommended values of the elements obtained are not necessarily in line with the reality, so the transition height obtained is not ideal.

SUMMARY

The object of the present invention is to provide a method for determining transition height elements in a flight climbing stage based on constant value segment identification, which takes into full consideration the identification of a constant-speed segment and a constant-Mach segment of a track, so as to better determine the transition height elements.

A technical solution for realizing the object of the present invention is as follows: a method for determining transition height elements in a flight climbing stage based on constant value segment identification, comprises the following steps of:

step 1: for track data $TR=\{tp_i, i=1,\ldots,n\}$ of one flight, wherein an $i^{th}$ track point $tp_i$ is denoted by one vector, $tp_i=[ts_i, sp_i, ma_i]$, $ts_i$, $sp_i$ and $ma_i$ respectively denote a time, a speed and a Mach number of the current track point, respectively extracting a speed component and a Mach component from the track TR and recording the two components as a first speed component $TR_{s\_raw}$ and a first Mach component $TR_{m\_raw}$;

step 2: expanding the first speed component $TR_{s\_raw}$ and the first Mach component $TR_{m\_raw}$ by adopting a linear interpolation method to obtain a second speed component $TR_s$ and a second Mach component $TR_m$;

step 3: discretizing the second speed component $TR_s$ of the track to obtain a discrete speed component $TR_{sd}$;

step 4: filtering each discrete value in the discrete speed component $TR_{sd}$ according to a threshold thr, and acquiring a speed discrete value set SP;

step 5: identifying a constant-speed segment of the flight according to the speed discrete value set SP, and acquiring a maximum constant-speed value $sp_c$ and a maximum moment $ts_{cs}$ of the constant-speed segment;

step 6: keeping the Mach component of the track with a time no less than the $ts_{cs}$ in the second Mach component $TR_m$ to obtain a third Mach component $TR_{m\_cut}$;

step 7: discretizing the third Mach component $TR_{m\_cut}$ of the track to obtain a discrete Mach component $TR_{md}$;

step 8: filtering each discrete value in the discrete Mach component $TR_{md}$ according to the threshold thr to acquire a Mach discrete value set MA;

step 9: identifying a constant-Mach segment of the flight according to the Mach discrete value set MA, and acquiring a constant-Mach value $ma_c$ corresponding to a minimum moment;

step 10: calculating a transition height $H_{trans}$ of the flight according to the maximum constant-speed value $sp_c$ and the constant-Mach value $ma_c$ corresponding to the minimum moment; and step 11: obtaining a real situation of flight track and adjusting flying parameters of the flight.

In one implementation, in the step 1, the process of extracting the speed component and the Mach component is: the first speed component is that $TR_{s\_raw}=\{s_i, i=1,\ldots,n\}$, wherein $s_i=[ts_i, sp_i]$; the first Mach component is that $TR_{m\_raw}=\{m_i, i=1,\ldots,n\}$, wherein $m_i=[ts_i, ma_i]$; and n denotes a total number of track points in the track data TR, and n is a positive integer.

In one implementation, in the step 2, the linear interpolation process is:

step 2.1: arranging the track points in the first speed component $TR_{s\_raw}$ and the first Mach component $TR_{m\_raw}$ in an ascending order according to the time $ts_i$ of the track points, wherein the time $ts_i$ of the track points is in a unit of second;

step 2.2: when $ts_{i+1}-ts_i>1$, respectively interpolating $ts_{i+1}-ts_i-1$ speed values and Mach values respectively, wherein the $p^{th}$ interpolated speed value is that $s_{interp\_p}=[ts_i+p, sp_i+p(sp_{i+1}-sp_i)/(ts_{i-1}-ts_i)]$, and the $p^{th}$ interpolated Mach value is that $m_{interp\_p}=[ts_i+p, ma_i+p(ma_{i+1}-ma_i)/(ts_{i+1}-ts_i)]$, wherein $p=1,2,\ldots,ts_{i+1}-ts_i-1$; and step 2.3: when $ts_{i+1}-ts_i \leq 1$, no interpolation is needed; after interpolating the track points in the first speed component $TR_{s\_raw}$ and the first Mach component $TR_{m\_raw}$, acquiring a second speed component $TR_s=\{s_{idx}, =1,\ldots,N\}$, wherein $s_{idx}=[ts_{idx}, sp_{idx}]$, and a second Mach component $TR_m=\{m_{idx}=1,\ldots,N\}$, wherein $m_{idx}=[ts_{idx}, ma_{idx}]$, and N denotes a sum of a total number of track points and a total number of interpolation points in the track data TR.

In one implementation, in the step 3, the process of discretizing the second speed component $TR_s$ of the track is: for any speed $sp_{idx}$ in the second speed component $TR_s$, in a unit of knot, when satisfying that $qj-0.5q \leq sp_{idx} < qj+0.5q$, then a discrete value of the speed is that $sp_{idx}^d=qj$, wherein q is a speed discrete precision, and q belongs to $R^+$, j is an index variable, and $j=0,1,2,\ldots$; and a speed component discrete value is that $TR_{sd}=\{s_{idx}^d, idx=1,\ldots,N\}$, wherein $s_{idx}^d=[ts_{idx}, sp_{idx}^d]$.

In one implementation, in the step 4, the process of acquiring the speed discrete value set SP is: setting the threshold to be that thr=0.0IN, then the speed discrete value set is that $SP=\{sp_{idx}^d || TR_{sd}(sp_{idx}^d)| \geq thr, idx=1,2,\ldots,N\}$ wherein $|TR_{sd}(sp_{idx}^d)|$ denotes a number of $sp_{idx}^d$ contained in the $TR_{sd}$.

In one implementation, in the step 5, the process of acquiring the maximum constant-speed value $sp_c$ and the maximum moment of the constant-speed segment $ts_{cs}$ is:

step 5.1: arranging the elements in the speed discrete value set SP in a descending order, and acquiring that $SP=[sp_1^c, sp_2^c,\ldots,sp_k^c,\ldots,sp_{|Sp|}^c]$, wherein |SP| denotes a number of elements in the speed discrete value set SP, $1 < k < SP|$, and letting that $k=1$;

step 5.2: acquiring a first track point set $TR_s^k=\{s_{idx}^d | s_{idx}^d \in TR_{sd}, spidxd=sp_{idx}^d=sp_k^c, idx=1,\ldots,N\}$;

step 5.3: arranging the track points $s_{idx}^d$ in the first track point set $TR_s^k$ according to an ascending ordering of $ts_{idd}$, and when a time difference of two continuous track points is less than or equal to 4 seconds, dividing the two track points into one track point set; if the time difference is greater than 4 seconds, dividing the previous track point into a current track point set and dividing the latter track point into next track point set, thus dividing the track points into $g_k$ track point sets, wherein $TR_s^k=\{TR_{s1}^k, TR_{s2}^k,\ldots TR_{sgk}^k\}$;

step 5.4: detecting each track point set, and discarding a track point set if a total duration of the track point group is less than 30 seconds or a standard deviation of a speed value of the track point set is greater than 0.3q; otherwise, keeping the track point set; and step 5.5: when a number of the kept track point sets is greater than or equal to 1, then $sp_c=sp_k^c$ and the maximum moment in the track point set is $ts_{cs}$, executing step 6; when the number of the kept track point sets is 0, and $k+1 \leq |SP|$, letting $k \rightarrow k+1$, and skipping to step 5.2; and when $k+1 > |SP|$, letting that $sp_c=-1$, and $ts_{cs}=0$, and then executing step 6.

In one implementation, in the step 6, the process of acquiring the third Mach component $TR_{m\_cut}$ is: recording a number of elements in the third Mach component $TR_{m\_cut}$ as $N_{cut}$, wherein $TR_{m\_cut}=\{m_{idx} | m_{idx} \in TR_m, ts_{idx} \geq ts_{cs}, idx=1,2,\ldots,N\}$; and in step 7: the process of discretizing the third Mach component $TR_{m\_cut}$ of the track is: for any Mach number $ma_{index}$, the Mach number $ma_{index}$ is dimensionless; when the Mach number satisfies that $uj-0.5u \leq ma_{index} uj+0.5u$, a discrete value of the Mach number is that $ma_{index}^d=uj$, wherein u denotes a Mach number discrete precision, u belongs to $R+$, j is an index variable, and $j=0,1,2,\ldots$; and a Mach component discrete value is that $TR_{md}=\{m_{index}^d, index=1,\ldots,N_{cut}\}$, wherein $m_{index}^d=[ts_{index}, ma_{index}^d]$.

In one implementation, in the step 8, the process of acquiring the Mach discrete value set MA is: setting the threshold to be that thr=0.01N, then the Mach discrete value set is that $MA=\{ma_{index}^d || TR_{md}(ma_{index}^d)| \geq thr, index=1, 2,\ldots,N_{cut}\}$, wherein $|TR_{md}(ma_{index}^d)|$ denotes a number of $ma_{index}^d$ contained in the discrete Mach component $TR_{md}$.

In one implementation, in the step 9, the process of acquiring the constant—Mach value $ma_c$ corresponding to the minimum moment is:

step 9.1: recording that $MA=[ma_1^c, ma_2^c,\ldots, ma_{k1}^c,\ldots, ma_{|MA|}^c]$, wherein |MA| denotes a number of elements in the Mach discrete value set MA, and $1 \leq k1 \leq |MA|$; letting that $ts_{cm}=+\infty$, and $ma_c=-1$; and letting that $k1=1$;

step 9.2: acquiring a second track point set $$TR_m^{k1}=\{m_{index}^d | m_{index}^d \in TR_{md}, ma_{index}^d = ma_{k1}^c, \text{index}=1,\ldots,N_{cut}\};$$

step 9.3: arranging the track points $m_{index}^d$ in the second track point set $TR_m^{k1}$ according to an ascending ordering of $ts_{index}$ and when a time difference of two continuous track points is less than or equal to 4 seconds, dividing the two track points into one track point set; if the time difference is greater than 4 seconds, dividing the previous track point into a current track point set and dividing the latter track point into next track point set, thus dividing the track points into $g_{k1}$ track point sets, wherein $TR_m^{k1}=\{TR_{m1}^{k1}, TR_{m2}^{k1},\ldots TR_{mgk1}^{k1}\}$;

step 9.4: detecting each track point set, and discarding a track point set if a total duration of the track point group is less than 100 seconds or a standard deviation of a Mach value of the track point set is greater than 0.3u; otherwise, keeping the track point set; and step 9.5: when a number of the kept track point sets is greater than or equal to 1, and the minimum moment $ts_{min}$ in the track point set is less than $ts_{cm}$, setting that $ts_{cm}=ts_{min}$, and $ma_c=ma_{k1}^c$, and then executing step 10; when the number of the kept track point sets is 0, and $k1+1 \leq |MA|$, letting $k1 \rightarrow k1+1$, and skipping to step 9.2; and when $k1+1 > |MA|$, letting that $ma_c=-1$, and $ts_{cm}=+\infty$, and then executing step 10.

In one implementation, in the step 10, the process of calculating the transition height of the flight is: when $sp_c=-1$ or $ma_c=-1$, the transition height elements are not obtained, and the transition height cannot be calculated; otherwise, values of $sp_c$ and $ma_c$ are substituted according to a transition height calculation function provided by Base of Aircraft Data (BADA) to calculate the transition height.

According to the result of step 10, the real situation of the flight track is obtained, which is used for adjusting flying parameters of the flight.

The method for determining the transition height elements in the flight climbing stage based on constant value segment identification according to the present invention is loaded and operated in a processing server of an air traffic flow management system (ATFM system) or a corresponding computer of an air traffic control system (ATC system).

Beneficial Effects:

Compared with the prior art, the present invention has the obvious advantages that: the constant-speed segment and the constant-Mach segment of the track are automatically identified by using the constant value segment identification method, so as to determine the constant-speed value and the constant-Mach value to obtain the transition height element in the flight climbing stage, which can better reflect the real situation of the track.

BRIEF DESCRIPTION OF THE DRAWINGS

The advantages of the above and/or other aspects of the present invention will become more apparent by further explaining the present invention with reference to the following drawings and detailed description.

DETAILED DESCRIPTION

The embodiments of the present invention will be described hereinafter with reference to the drawings.

Figure 1:
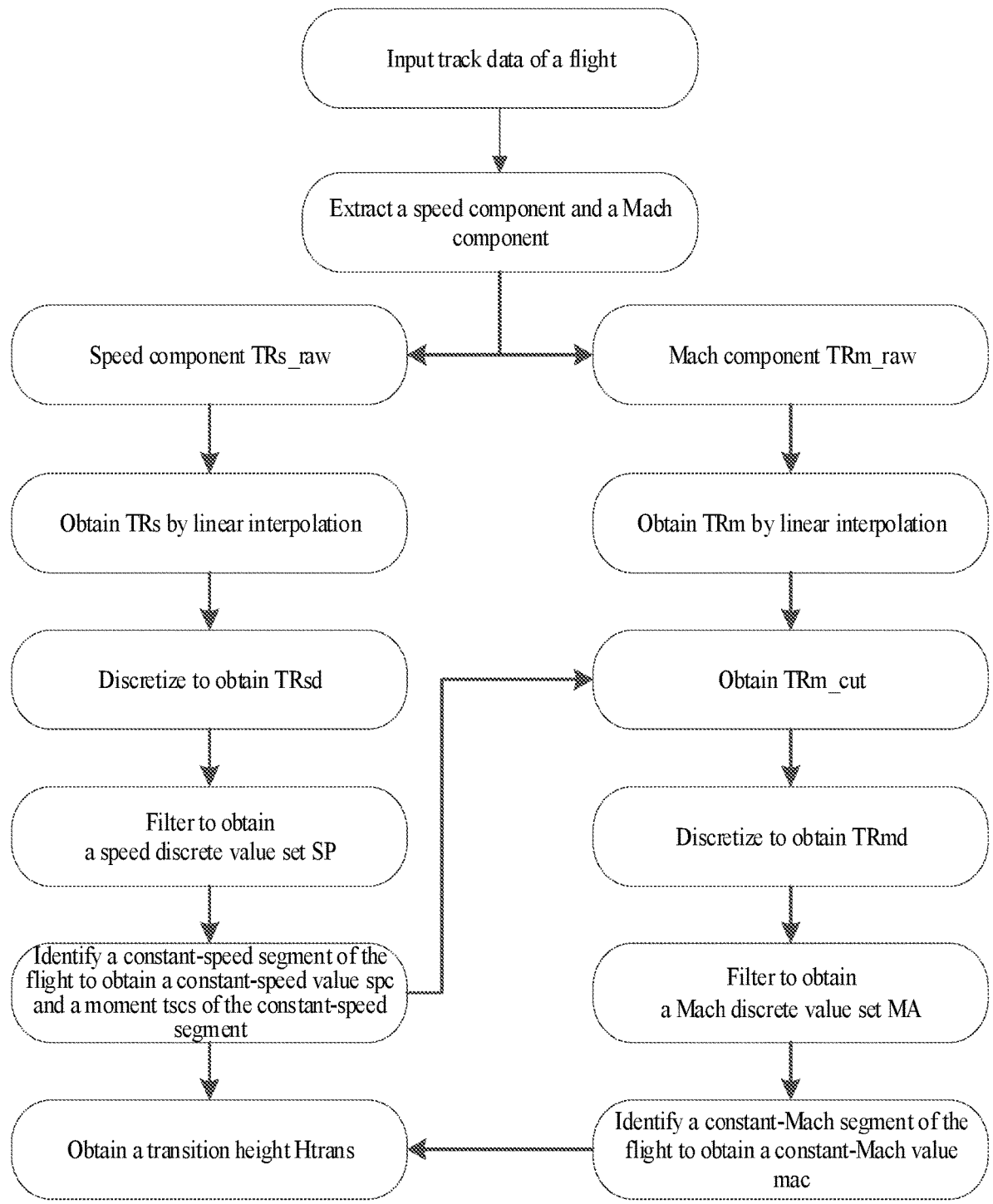
FIG. 1 is a flow chart of a method for determining transition height elements in a flight climbing stage based on constant value segment identification.

With reference to FIG. 1, a method for determining transition height elements in a flight climbing stage based on constant value segment identification of the present invention comprises the following steps of:

step 1: for track data $TR=\{tp_i, i=1, \ldots, n\}$ of one flight, wherein an $i^{th}$ track point $tp_i$ is denoted by one vector, $tp_i=[ts_i, sp_i, ma_i]$, $ts_i$, $sp_i$ and $ma_i$ respectively denote a time, a speed and a Mach number of the current track point, respectively extracting a speed component and a Mach component from the track TR and recording the two components as a first speed component $TR_{s\_raw}$ and a first Mach component $TR_{m\_raw}$;

the process of extracting the speed component and the Mach component being: the first speed component is that $TR_{s\_raw}=\{s_i, i=1, \ldots, n\}$, wherein $s_i=[ts_i, sp_i]$; the first Mach component is that $TR_{m\_raw}=\{m_i, i=1, \ldots, n\}$, wherein $m_i=[ts_i, ma_i]$; and n denotes a total number of track points in the track data $TR_i$ and n is a positive integer.

Step 2: expanding the first speed component $TR_{s\_raw}$ and the first Mach component $TR_{m\_raw}$ by adopting a linear interpolation method to obtain a second speed component $TR_s$ and a second Mach component $TR_m$;

the linear interpolation process is:

step 2.1: arranging the track points in the first speed component $TR_{s\_raw}$ and the first Mach component $TR_{m\_raw}$ in an ascending order according to the time $ts_i$ of the track points, wherein the time $ts_i$ of the track points is in a unit of second;

step 2.2: when $ts_{i+1}-ts_i>1$, respectively interpolating $ts_{i+1}-ts_i-1$ speed values and Mach values respectively, wherein the $p^{th}$ interpolated speed value is that $s_{interp\_p}=[ts_i+p, sp_i+p(sp_{i+1}-sp_i)/(ts_{i+1}-ts_i)]$, and the $p^{th}$ interpolated Mach value is that $m_{interp\_p}=[ts_i+p, ma_i+p(ma_{i+1}-ma_i)/(ts_{i+1}-ts_i)]$, wherein $p=1,2,\ldots,ts_{i+1}-ts_i-1$; and step 2.3: when $ts_{i+1}-ts_i\leq 1$, no interpolation is needed; after interpolating the track points in the first speed component $TR_{s\_raw}$ and the first Mach component $TR_{m\_raw}$, acquiring a second speed component $TR_s=\{s_{idx}, idx=1, \ldots, N\}$, wherein $s_{idx}=[ts_{idx}, sp_{idx}]$, and a second Mach component $TR_m=\{m_{idx}, idx=1, \ldots, N\}$, wherein $m_{idx}=[ts_{idx}, ma_{idx}]$, and N denotes a sum of a total number of track points and a total number of interpolation points in the track data TR.

Step 3: discretizing the second speed component $TR_s$ of the track to obtain a discrete speed component $TR_{sd}$;

for any speed $sp_{idx}$ in the second speed component $TR_s$, in a unit of knot, when satisfying that $qj-0.5q \leq sp_{idx} < qj+0.5q$, then a discrete value of the speed is that $sp_{idx}^d=qj$, wherein q is a speed discrete precision, and q belongs to $R^+$, j is an index variable, and $j=0,1,2,\ldots$; and a speed component discrete value is that $TR_{sd}=\{s_{idx}^d=1, \ldots, N\}$, wherein $s_{idx}^d=[ts_{idx}^d]$.

Step 4: filtering each discrete value in the discrete speed component $TR_{sd}$ according to a threshold thr, and acquiring a speed discrete value set SP;

setting the threshold to be that thr=0.01N, then the speed discrete value set is that $SP=\{sp_{idx}^d||TR_{sd}(sp_{idx}^d)|\geq thr, idx=1, 2,\ldots,N\}$, wherein $|TR_{sd}(sp_{idx}^d)|$ denotes a number of $sp_{idx}^d$ contained in the $TR_{sd}$.

Step 5: identifying a constant-speed segment of the flight according to the speed discrete value set SP, and acquiring a maximum constant-speed value $sp_c$ and a maximum moment $ts_{cs}$, of the constant-speed segment;

step 5.1: arranging the elements in the speed discrete value set SP in a descending order, and acquiring that $SP=[sp_1^c, sp_2^c, \ldots, sp_k^c, \ldots sp_{|SP|}^c]$, wherein |SP| denotes a number of elements in the speed discrete value set SP, $1\leq k\leq |SP|$, and letting that k=1;

step 5.2: acquiring a first track point set $TR_s^k=\{s_{idx}^d|s_{idx}^d\in TR_{sd}, sp_{idx}^d=sp_k^c, idx=1,\ldots,N\}$;

step 5.3: arranging the track points $s_{idx}^d$ in the first track point set $TR_s^k$ according to an ascending ordering of $ts_{idx}$, and when a time difference of two continuous track points is less than or equal to 4 seconds, dividing the two track points into one track point set; if the time difference x is greater than 4 seconds, dividing the previous track point into a current track point set and dividing the latter track point into next track point set, thus dividing the track points into $g_k$ track point sets, wherein $TR_s^k=\{TR_{s1}^k, TR_{s2}^k, \ldots TR_{sg1}^k\}$;

step 5.4: detecting each track point set, and discarding a track point set if a total duration of the track point group is less than 30 seconds or a standard deviation of a speed value of the track point set is greater than 0.3 q, and q=6; otherwise, keeping the track point set; and step 5.5: when a number of the kept track point sets is greater than or equal to 1, then $sp_c=sp_k^c$ and the maximum moment in the track point set is $ts_{cs}$, executing step 6; when the number of the kept track point sets is 0, and $k+1\leq |SP|$, letting $k\rightarrow k+1$ and skipping to step 5.2; and when $k+1>|SP|$, letting that $sp_c=-1$, and $ts_{cs}=0$, and then executing step 6.

Step 6: keeping the Mach component of the track with a time no less than the $ts_{cs}$ in the second Mach component $TR_m$ to obtain a third Mach component $TR_{m\_cut}$;

recording a number of elements in the third Mach component $TR_{m\_cut}$ as $N_{cute}$, wherein $TR_{m\_cut}=\{m_{idx}|m_{idx}\in TR_m, ts_{idx}\geq ts_{cs}, idx=1,2,\ldots,N\}$.

Step 7: discretizing the third Mach component $TR_{m\_cut}$ of the track to obtain a discrete Mach component $TR_{md}$;

for any Mach number $ma_{index}$, the Mach number $ma_{index}$ is dimensionless; when the Mach number satisfies that $uj-0.5u\leq ma_{index}<uj+0.5u$, a discrete value of the Mach number is that $ma_{index}^d=uj$, wherein u denotes a Mach number discrete precision, u belongs to $R^+$, in this embodiment, u=0.01, j is an index variable, and $j=0,1,2,\ldots$; and a Mach component discrete value is that $TR_{md}=\{m_{index}^d, index=1,\ldots,N\}$, wherein $m_{index}^d=[ts_{index}, ma_{index}^d]$.

Step 8: filtering each discrete value in the discrete Mach component $TR_{md}$ according to the threshold thr to acquire a Mach discrete value set MA;

setting the threshold to be that thr=0.01N, then the Mach discrete value set is that $MA=\{ma_{index}^d||TR_{md}(ma_{index}^d)|\geq thr, index=1, 2, \ldots, N_{cut}\}$, wherein $TR_{md}(ma_{index}^d)|$ denotes a number of $ma_{index}^d$ contained in the discrete Mach component $TR_{md}$.

Step 9: identifying a constant-Mach segment of the flight according to the Mach discrete value set MA, and acquiring a constant-Mach value $ma_c$ corresponding to a minimum moment;

step 9.1: recording that $MA=[ma_1^c, ma_2^c, \ldots, ma_{k1}^c, \ldots, ma_{|MA|}^c]$, wherein $=MA|$ denotes a number of elements in the Mach discrete value set MA, and $1\leq k1 \leq |MA|$; letting that $ts_{cm}=+\infty$, and $ma_c=-1$; and letting that $k1=1$;

step 9.2: acquiring a second track point set $$TR_m^{k1}=\{m_{index}^d|m_{index}^d \in TR_{md}, ma_{index}^d=ma_{k1}^c, index=1, \ldots, N_{cut}\};$$

step 9.3: arranging the track points $m_{index}^d$ in the second track point set TR. according to an ascending ordering of $ts_{index}$, and when a time difference of two continuous track points is less than or equal to 4 seconds, dividing the two track points into one track point set; if the time difference is greater than 4 seconds, dividing the previous track point into a current track point set and dividing the latter track point into next track point set, thus dividing the track points into $g_{k1}$ track point sets, wherein $TR_m^{k1}=\{TR_{m1}^{k1}, TR_{m2}^{k1}, \ldots TR_{mgk1}^{k1}\}$;

step 9.4: detecting each track point set, and discarding a track point set if a total duration of the track point group is less than 100 seconds or a standard deviation of a Mach value of the track point set is greater than 0.3 u (u=0.01); otherwise, keeping the track point set; and step 9.5: when a number of the kept track point sets is greater than or equal to 1, and the minimum moment $ts_{min}$ in the track point set is less than $ts_{cm}$, setting that $ts_{cm}=ts_{min}$, and $ma_c=ma_{k1}^c$, and then executing step 10; when the number of the kept track point sets is 0, and $k1+1\leq|MA|$, letting $k1\rightarrow k1+1$, and skipping to step 9.2; and when $k1+1>|MA|$, letting that $ma_c=-1$, and $ts_{cm}=+\infty$, and then executing step 10.

Step 10: calculating a transition height $H_{trans}$ of the flight according to the maximum constant-speed value $sp_c$ and the constant-Mach value $ma_c$ corresponding to the minimum moment.

When $sp_c=-1$ or $ma_c=-1$, the transition height elements are not obtained, and the transition height cannot be calculated; otherwise, values of $sp_c$ and $ma_c$ are substituted according to a transition height calculation function provided by Base of Aircraft Data BADA to calculate the transition height.

Figure 2:
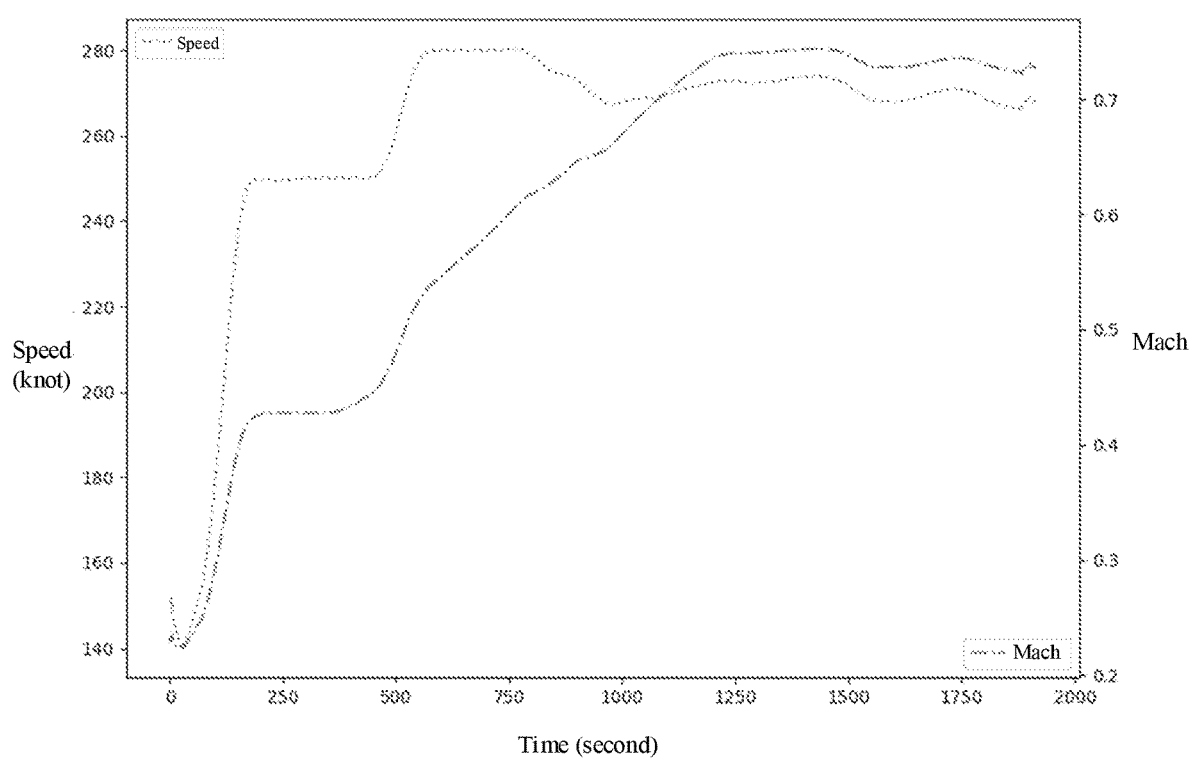
FIG. 2 shows a flight speed profile and a Mach number profile of an embodiment of the present invention.
Figure 3:
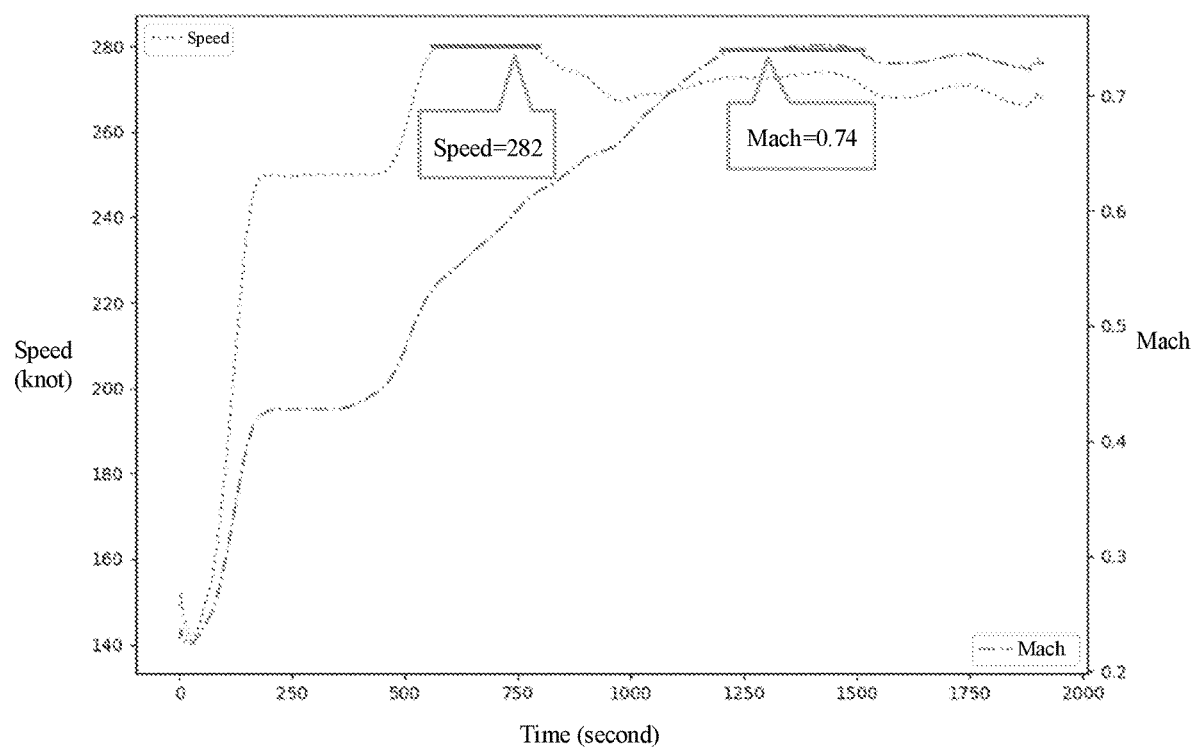
FIG. 3 is a result diagram of a constant-speed segment and a constant-Mach segment of track climbing obtained by the present invention.

With reference to FIG. 2 to FIG. 3, the present invention will be further explained through the example of simulation experiment and effect evaluation thereof hereinafter.

In this embodiment, as shown in FIG. 2, every two curves are a speed profile and a Mach number profile of one track. The object of the experiment is to determine the constant-speed value and the constant-Mach value of the track by the constant value segment identification method so as to determine the transition height. FIG. 3 shows the results of the constant-speed value and the constant-Mach value obtained by the method of the present invention, and two solid lines in the figure represent the constant-speed segment and the constant-Mach segment identified respectively. The results show that the method of the present invention can accurately determine the constant-speed value and the constant-Mach value, and obtain the accurate transition height, and the method of the present invention has excellent performances.

According to the result of step 10, the real situation of the flight track is obtained, which is used for adjusting flying parameters of the flight.

The method for determining the transition height elements in the flight climbing stage based on constant value segment identification according to this embodiment is loaded and operated in a processing server this embodiment an air traffic flow management system (ATFM system) or a corresponding computer of an air traffic control system (ATC system).

In a specific implementation, the present application provides a computer storage medium and a corresponding data processing unit, wherein the computer storage medium is capable of storing a computer program, and the computer program, when executed by the data processing unit, can run the inventive contents of the method for determining the transition height elements in the flight climbing stage based on constant value segment identification provided by the present invention and some or all steps in various embodiments. The storage medium may be a magnetic disk, an optical disk, a Read Only Storage (ROM) or a Random Access Storage (RAM), and the like.

Those skilled in the art can clearly understand that the technical solutions in the embodiments of the present invention can be realized by means of a computer program and a corresponding general hardware platform thereof. Based on such understanding, the essence of the technical solutions in the embodiments of the present invention or the part contributing to the prior art, may be embodied in the form of a computer program, i.e., a software product. The computer program, i.e., the software product is stored in a storage medium comprising a number of instructions such that a device (which may be a personal computer, a server, a singlechip, a MUU or a network device, and the like) comprising the data processing unit executes the methods described in various embodiments or some parts of the embodiments of the present invention.

The present invention provides the method for determining the transition height elements in the flight climbing stage based on constant value segment identification. There are many methods and ways to realize the technical solutions. The above is only the specific embodiments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A method for determining transition height elements in a flight climbing stage based on constant value segment identification, comprising a non-transitory computer readable medium operable on a computer with memory for the method for determining transition height elements in the flight climbing stage, and comprising program instructions for executing the following steps of:

step 1: for track data $TR=\{tp_i, i=1, \ldots, n\}$ of one flight, wherein an $i^{th}$ track point $tp_i$ is denoted by one vector, $tp_i=[ts_i, sp_i, ma_i]$, $ts_i$, $sp_i$ and $ma_i$ respectively denote a time, a speed and a Mach number of the current track point, respectively extracting a speed component and a Mach component from the track TR and recording the two components as a first speed component $TR_{s\_raw}$ and a first Mach component $TR_{m\_raw}$; wherein, n denotes a total number of track points in the track data TR, and n is a positive integer;

step 2: expanding the first speed component $TR_{s\_raw}$ and the first Mach component $TR_{m\_raw}$ by adopting a linear interpolation method to obtain a second speed component $TR_s$ and a second Mach component $TR_m$;

step 3: discretizing the second speed component $TR_s$ of the track to obtain a discrete speed component $TR_{sd}$;

step 4: filtering each discrete value in the discrete speed component $TR_{sd}$ according to a threshold thr, and acquiring a speed discrete value set SP;

step 5: identifying a constant-speed segment of the flight according to the speed discrete value set SP, and acquiring a maximum constant-speed value $sp_c$ and a maximum moment $ts_{cs}$ of the constant-speed segment;

Step 6: keeping the Mach component of the track with a time no less than the $ts_{cs}$, in the second Mach component $TR_m$ to obtain a third Mach component $TR_{m\_cut}$;

step 7: discretizing the third Mach component $TR_{m\_cut}$ of the track to obtain a discrete Mach component $TR_{md}$;

step 8: filtering each discrete value in the discrete Mach component $TR_{md}$ according to the threshold thr to acquire a Mach discrete value set MA;

step 9: identifying a constant-Mach segment of the flight according to the Mach discrete value set MA, and acquiring a constant-Mach value $ma_c$ corresponding to a minimum moment;

step 10: calculating a transition height $H_{trans}$ of the flight according to the maximum constant-speed value $sp_c$ and the constant-Mach value $ma_c$ corresponding to the minimum moment; and step 11: obtaining a real situation of the flight track and adjusting flying parameters of the flight based on results of the method for determining transition height elements in the flight climbing stage; which achieves fuel efficiency by controlling an aircraft in stratosphere with low air resistance, and facilitates real-time adjustment to resolve flight conflicts.

2. The method for determining the transition height elements in the flight climbing stage based on constant value segment identification according to claim 1, wherein in the step 1, the process of extracting the speed component and the Mach component is: the first speed component is that $TR_{s\_raw}=\{s_i, i=1, \ldots, n\}$, wherein $s_i=[ts_i, sp_i]$; and the first Mach component is that $TR_{m\_raw}=\{m_i, i=1, \ldots, n\}$, wherein $m_i=[ts_i, ma_i]$.

3. The method for determining the transition height elements in the flight climbing stage based on constant value segment identification according to claim 2, wherein in the step 2, the linear interpolation process is:

step 2.1: arranging the track points in the first speed component $TR_{s\_raw}$ and the first Mach component $TR_{m\_raw}$ in an ascending order according to the time $ts_i$ of the track points, wherein the time $ts_i$ of the track points is in a unit of second;

step 2.2: when $ts_{i+1}-ts_i<1$, respectively interpolating $ts_{i+1}-ts_i-1$ speed values and Mach values respectively, wherein the $p^{th}$ interpolated speed value is that $s_{interp\_p}=[ts_i+p, sp_i+p(sp_{i+1}-sp_i)/(ts_{i+1}-ts_i)]$, and the $p^{th}$ interpolated Mach value is that $m_{interp\_p}=[ts_i+p, ma_i+p(ma_{i+1}-ma_i)/(ts_{i+1}-ts_i)]$, wherein $p=1,2,\ldots,ts_{i+1}-ts_i-1$; and step 2.3: when $ts_{i+1}-ts_i \leq 1$, no interpolation is needed; after interpolating the track points in the first speed component $TR_{s\_raw}$ and the first Mach component $TR_{m\_raw}$, acquiring a second speed component $TR_s=\{s_{idx}, idx=1, \ldots, N\}$, wherein $s_{idx}=[ts_{idx}, sp_{idx}]$, and a second Mach component $TR_m=\{m_{idx}, idx=1, \ldots, N\}$, wherein $m_{idx}=[ts_{idx}, ma_{idx}]$, and N denotes a sum of a total number of track points and a total number of interpolation points in the track data TR.

4. The method for determining the transition height elements in the flight climbing stage based on constant value segment identification according to claim 3, wherein in the step 3, the process of discretizing the second speed component $TR_s$ of the track is: for any speed $sp_{idx}$ in the second speed component $TR_s$, in a unit of knot, when satisfying that $qj-0.5q \leq sp_{idx}<qj+0.5q$, then a discrete value of the speed is that $sp_{idx}^d=qj$, wherein q is a speed discrete precision, and q belongs to $R^+$, j is an index variable, and $j=0,1,2,\ldots$; and a speed component discrete value is that $TR_{sd}=\{s_{idx}^d, idx=1, \ldots, N\}$, wherein $s_{idx}^d=[ts_{idx}, sp_{idx}^d]$.

5. The method for determining the transition height elements in the flight climbing stage based on constant value segment identification according to claim 4, wherein in the step 4, the process of acquiring the speed discrete value set SP is: setting the threshold to be that thr=0.01N, then the speed discrete value set is that $SP=\{sp_{idx}^d||TR_{sd}(sp_{idx}^d)|\geq thr, idx=1,2,\ldots,N\}$, wherein $|TR_{sd}(sp_{idx}^d)|$ denotes a number of $sp_{idx}$ contained in the $TR_{sd}$.

6. The method for determining the transition height elements in the flight climbing stage based on constant value segment identification according to claim 5, wherein in the step 5, the process of acquiring the maximum constant-speed value $sp_c$ and the maximum moment $ts_e$, of the constant-speed segment is:

Step 5.1: arranging the elements in the speed discrete value set SP in a descending order, and acquiring that $SP=[sp_1^c, sp_2^c, \ldots, sp_k^c, \ldots, sp_{|SP|}^c]$, wherein $|SP|$ denotes a number of elements in the speed discrete value set SP, $1 \leq k \leq |SP|$, and letting that $k=1$;

step 5.2: acquiring a first track point set $TR_s^k=\{s_{idx}^d | s_{idx}^d \in TR_{sd}, sp_{idx}^d=sp_k^c, idx=1, \ldots, N\}$;

step 5.3: arranging the track points $s_{idx}^d$ in the first track point set $TR_s^k$ according to an ascending ordering of $ts_{idx}$, and when a time difference of two continuous track points is less than or equal to 4 seconds, dividing the two track points into one track point set; if the time difference is greater than 4 seconds, dividing the previous track point into a current track point set and dividing the latter track point into next track point set, thus dividing the track points into $g_k$ track point sets, wherein $TR_s^k=\{TR_{s1}^k, TR_{s2}^k, \ldots TR_{sg1}^k\}$;

step 5.4: detecting each track point set, and discarding a track point set if a total duration of the track point group is less than 30 seconds or a standard deviation of a speed value of the track point set is greater than 0.3q; otherwise, keeping the track point set; and step 5.5: when a number of the kept track point sets is greater than or equal to 1, then $sp_c=sp_k^c$ and the maximum moment in the track point set is $ts_{cs}$, executing step 6; when the number of the kept track point sets is 0, and k+1|SP|, letting k→k+1, and skipping to step 5.2; and when k+1>|SP|, letting that $sp_c=-1$, and $ts_{cs}=0$, and then executing step 6.

7. The method for determining the transition height elements in the flight climbing stage based on constant value segment identification according to claim 6, wherein in the step 6, the process of acquiring the third Mach component $TR_{m\_cut}$ is: recording a number of elements in the third Mach component $TR_{m\_cut}$ as $N_{cut}$ wherein $TR_{m\_cut}=\{m_{idx} | m_{idx} \in TR_m, ts_{idx} \geq ts_{cs}, idx=1,2, \ldots, N\}$; and in step 7: the process of discretizing the third Mach component $TR_{m\_cut}$, of the track is: for any Mach number $ma_{index}$, the Mach number $ma_{index}$ is dimensionless; when the Mach number satisfies that $uj-0.5u \leq ma_{index} < uj+0.5u$, a discrete value of the Mach number is that $ma_{index}^d = uj$, wherein u denotes a Mach number discrete precision, u belongs to $R^+$, j is an index variable, and j=0,1,2, . . . ; and a Mach component discrete value is that $TR_{md} = \{m_{index}^d, index=1, \ldots, N_{cut}\}$, wherein $m_{index}^d = [ts_{index}, ma_{index}^d]$.

8. The method for determining the transition height elements in the flight climbing stage based on constant value segment identification according to claim 7, wherein in the step 8, the process of acquiring the Mach discrete value set MA is: setting the threshold to be that thr=0.01N, then the Mach discrete value set is that $MA = \{ma_{index}^d || TR_{md}(ma_{index}^d)| \geq thr, index=1,2, \ldots N_{cut}\}$, wherein $|TR_{md}(ma_{index}^d)|$ denotes a number of $ma_{index}^d$ contained in the discrete Mach component $TR_{md}$.

9. The method for determining the transition height elements in the flight climbing stage based on constant value segment identification according to claim 8, wherein in the step 9, the process of acquiring the constant-Mach value $ma_c$ corresponding to the minimum moment is:

step 9.1: recording that $MA = [ma_1^c, ma_2^c, \ldots, ma_{k1}^c, \ldots, ma_{|MA|}^c]$, wherein |MA| denotes a number of elements in the Mach discrete value set MA, and $1 \leq k1 \leq |MA|$; letting that $ts_{cm} = +\infty$, and $ma_c = -1$; and letting that k1=1;

step 9.2: acquiring a second track point set $TR_m^{k1} = \{m_{index}^d | m_{index}^d \in TR_{md}, ma_{index}^d = ma_{k1}^c, index=1, \ldots, N_{cut}\}$;

step 9.3: arranging the track points $m_{index}^d$ in the second track point set $TR_m^{k1}$ according to an ascending ordering of $ts_{index}$, and when a time difference of two continuous track points is less than or equal to 4 seconds, dividing the two track points into one track point set; if the time difference is greater than 4 seconds, dividing the previous track point into a current track point set and dividing the latter track point into next track point set, thus dividing the track points into $g_{k1}$ track point sets, wherein $TR_m^{k1} = \{TR_{m1}^{k1}, TR_{m2}^{k1}, \ldots TR_{mgk1}^{k1}\}$;

step 9.4: detecting each track point set, and discarding a track point set if a total duration of the track point group is less than 100 seconds or a standard deviation of a Mach value of the track point set is greater than 0.3u; otherwise, keeping the track point set; and step 9.5: when a number of the kept track point sets is greater than or equal to 1, and the minimum moment $ts_{min}$ in the track point set is less than $ts_{cm}$, setting that $ts_{cm} = ts_{min}$, and $ma_c = ma_{k1}^c$ and then executing step 10; when the number of the kept track point sets is 0, and $k1+1 \leq |MA|$, letting $k1 \rightarrow k1+1$, and skipping to step 9.2; and when $k1+1 > |MA|$, letting that $ma_c = -1$, and $ts_{cm} = +\infty$, and then executing step 10.

10. The method for determining the transition height elements in the flight climbing stage based on constant value segment identification according to claim 9, wherein in the step 10, the process of calculating the transition height of the flight is: when $sp_c = -1$ or $ma_c = -1$, the transition height elements are not obtained, and the transition height cannot be calculated; otherwise, values of $sp_c$ and $ma_c$ are substituted according to a transition height calculation function provided by Base of Aircraft Data BADA to calculate the transition height.

\* \* \* \* \*